United States Patent [19]

Maerfeld et al.

[11] 4,281,350
[45] Jul. 28, 1981

[54] ACOUSTOELECTRIC DEVICE FOR READING OR PROCESSING A TWO-DIMENSIONAL OPTICAL IMAGE

[75] Inventors: Charles Maerfeld; Herve Gautier, both of Paris, France

[73] Assignee: Thomson-CSF, Paris, France

[21] Appl. No.: 75,225

[22] Filed: Sep. 13, 1979

[30] Foreign Application Priority Data

Sep. 19, 1978 [FR] France .............................. 78 26817

[51] Int. Cl.³ .............................................. H04N 5/30
[52] U.S. Cl. ................................... 358/213; 358/201; 310/313 B
[58] Field of Search ............................ 358/213, 201; 310/313 R, 313 A, 313 B, 322; 250/211 J, 211 R, 492 R, 492 A; 357/30

[56] References Cited

U.S. PATENT DOCUMENTS

| | | | |
|---|---|---|---|
| 4,069,507 | 1/1978 | DeFranould | 358/213 |
| 4,084,192 | 4/1978 | DeFranould | 358/213 |
| 4,085,348 | 4/1978 | Munier | 310/313 B |
| 4,122,495 | 10/1978 | DeFranould | 358/213 |
| 4,142,212 | 2/1979 | Scott | 358/213 |
| 4,225,887 | 9/1980 | Gautier | 358/213 |

Primary Examiner—Robert L. Griffin
Assistant Examiner—Michael A. Masinick
Attorney, Agent, or Firm—Roland Plottel

[57] ABSTRACT

The device comprises a piezoelectric medium associated with a semiconducting and photosensitive medium on which the optical image is projected. Four transducers placed on the piezoelectric medium emit four elastic waves in two distinct directions with wave numbers such that the signal resulting from the interaction of these waves has a zero wave number. Depending on the waveform of the signals applied to the transducers, it is possible to obtain either point-by-point reading of the image or the Fourier transform of said image.

10 Claims, 5 Drawing Figures

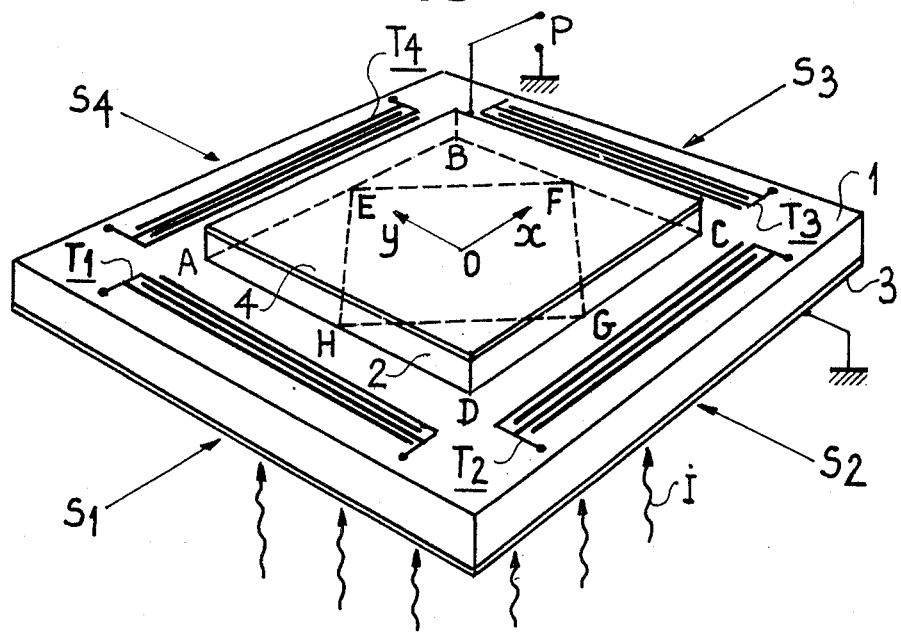
FIG_1
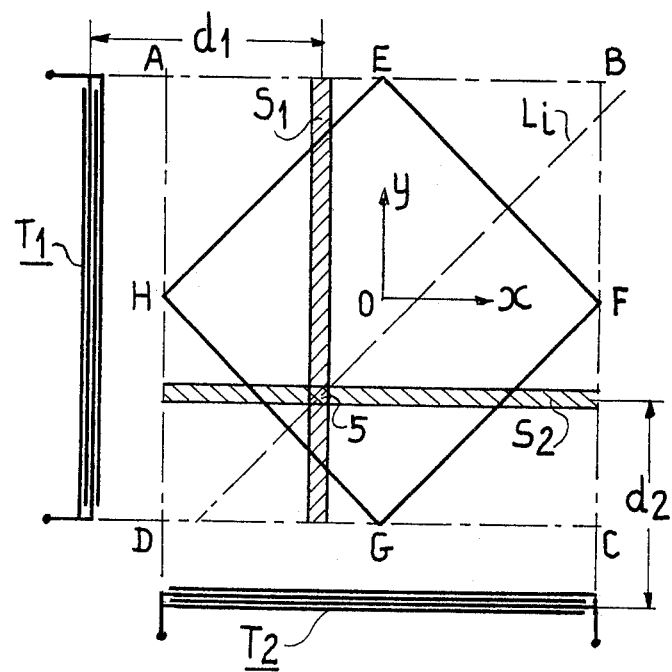
FIG_2

FIG_3
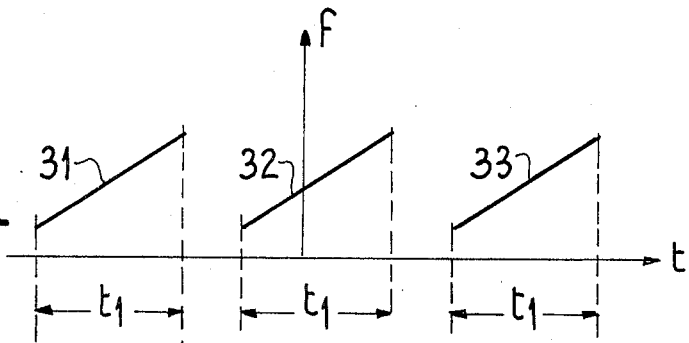
FIG_3-a
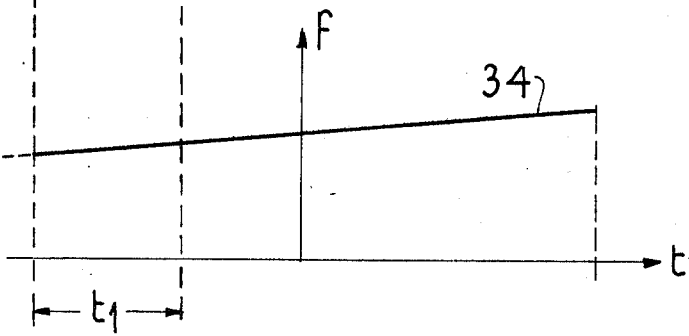
FIG_3-b
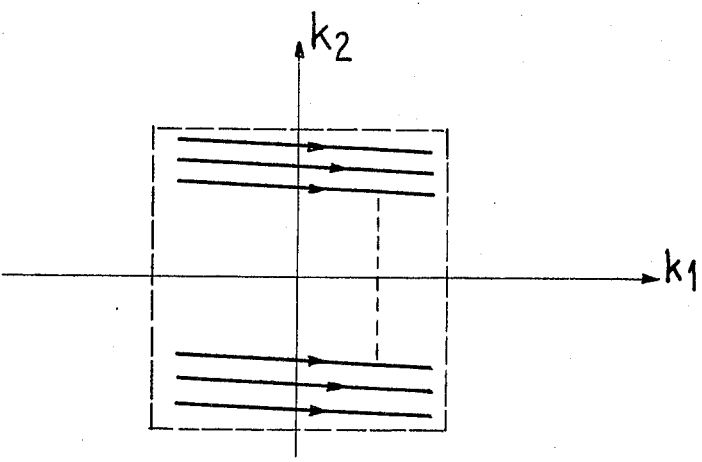
FIG_3-c

ACOUSTOELECTRIC DEVICE FOR READING OR PROCESSING A TWO-DIMENSIONAL OPTICAL IMAGE

This invention relates to a device for electrical reading or processing of a two-dimensional optical image by means of surface acoustic waves.

The reading of lamps by means of acoustic waves, also known as elastic waves, is carried out in most instances by means of non-linear interactions between electric fields in a semiconductor, namely the fields associated with deformations of a piezoelectric crystal in which surface elastic waves are propagated. By way of example, the signal representing the interaction can be the electric current which results from said interaction and which flows through the semiconductor. One type of structure which is suitable for this purpose consists of a small piezoelectric wafer and a small semiconductor wafer placed in oppositely-facing relation and separated by a thin film of air. The image to be read is projected onto the semiconductor in which, by spatially modulating the conductivity of this latter and its surface charge density, said image accordingly modulates the intensity of the signal resulting from the non-linear interaction.

Direct reading of a one-dimensional image is thus performed. In order to read two-dimensional images, the system must accordingly be adapted and different solutions for the achievement of this objective are already known.

It is possible for example to make use of two pulse-type waves which are emitted at the surface of the piezoelectric medium in two directions at right angles. The interaction of said waves gives rise in particular to the delivery of a spatially and time-independent signal collected at the level of the interaction zone by means of a detector having the same period as that of the signal produced. Said interaction zone is displaced along a line and the image is scanned line after line by varying the relative time-lag of the two waves. A system of this type is described, for example, in U.S. Pat. No. 4,069,507 filed in the name of THOMSON-CSF. The disadvantage of this system, however, lies in the fact that it calls for a periodic detector. In the first place, this results in greater complexity and therefore in higher cost. In the second place, signal processing possibilities are severely limited since the period of the reading signal must correspond to that of the detector and cannot be modified.

Another solution consists in adding to the system mentioned above a third acoustic wave which propagates in a direction and with a frequency such that the signal resulting from the interaction is spatially uniform in order to permit collection of the signal by a non-periodic detector. A system of this type is described in U.S. Pat. No. 4,085,348 filed in the name of Thomson-CSF. From a practical standpoint, however, this system suffers from a drawback which arises from the fact that propagation of the acoustic waves must take place in three different directions instead of two. Thus the piezoelectric material must in fact be chosen so as to ensure that the surface waves propagate in three directions in a suitable manner without dispersion and that the electromechanical coupling coefficient has a high value, with the result that the choice of this material is considerably limited.

The present invention is directed to a two-dimensional image reading device which makes it possible to overcome these drawbacks.

The device comprises a piezoelectric medium coupled to a photosensitive medium for converting the photons of the incident image to electric charges, and an electrically non-linear medium in which the amplitude of the signal produced by the non-linear interaction is dependent on the charge concentration. The piezoelectric medium carries four electromechanical transducers which, in one embodiment, are caused by electrical excitation to emit four waves in two different directions at the surface of the piezoelectric medium with wave numbers such that the resultant signal has a zero wave number. Depending on the waveform of the applied signals, point-by-point reading of the image or of its Fourier transform is obtained.

Further objects, distinctive features and results of the invention will become apparent from the following description and from the accompanying drawings, wherein:

FIG. 1 illustrates one embodiment of the device according to the invention;

FIG. 2 is an explanatory diagram of a first mode of operation of the device according to the invention;

FIGS. 3a, 3b and 3c are explanatory diagrams of another mode of operation of the device according to the invention.

In these different figures, the same references relate to the same elements.

One embodiment of the device according to the invention as shown in FIG. 1 comprises:

a piezoelectric substrate 1 in the form of a small rectangular plate or wafer, for example;

four electromechanical transducers $T_1$, $T_2$, $T_3$ and $T_4$ which are capable under the action of electrical excitation of emitting elastic waves at the surface of the substrate 1 and reciprocally, in two different directions Ox and Oy which are perpendicular to each other in the example shown in the figure. By way of example, the transducers are each constituted in a conventional manner by two electrodes in the form of combs having alternate teeth, the waves being emitted in the direction at right angles to the teeth of the combs. In the figure, the transducers $T_1$ and $T_3$ emit waves respectively in the directions $+\vec{Ox}$ and $-\vec{Ox}$ and the transducers $T_2$ and $T_4$ emit waves respectively in the directions $+\vec{Oy}$ and $-\vec{Oy}$. The zone ABCD of intersection of the elastic waves emitted is designated as the interaction surface. If the transducers have the same length and are placed in opposite relation in pairs, this constitutes a square as shown in the figure and each side of the square corresponds to the length of each transducer;

a photosensitive medium onto which is projected the image (I) to be read, thus converting the incident photons to surface or volume electric charges by photoresistance or photoconductivity effect, for example;

a so-called non-linear medium in which non-linear interactions between the signals applied to the device are capable of being reproduced, the amplitude of said interactions being dependent on the concentration of electric charges in this medium. Said medium is preferably semiconducting, can advantageously be combined with the aforesaid photosensitive medium, and can be of silicon, for example. In the embodiment which is illustrated in the figure, said semiconducting medium is provided in the form of a small plate or wafer 2 placed opposite to the piezoelectric substrate 1 on the same side as the transducers on the interaction surface ABCD and separated from this latter by a thin film of air;

means for sampling the electrical signals produced by the device, which can be constituted simply by a so-called ground electrode 3 connected to the reference potential of the device and adapted to cover the surface of the substrate 1 opposite to the surface which carries the transducers, and a continuous electrode 4 or so-called signal electrode placed on the surface of the substrate 2 opposite to the interaction surface.

The image I is projected onto that face of the semiconductor substrate 2 which is in oppositely-facing relation to the interaction surface, either through the semiconductor in which case the electrode 4 must be semi-transparent or through the piezoelectric substrate 1 as shown in the figure, in which case the electrode 3 is semi-transparent.

Moreover, different alternative embodiments not shown in the drawings can be contemplated for the construction of semiconductor and piezoelectric substrates. It is possible to combine the two media so as to form a single substrate of cadmium sulphide (CdS) or of gallium arsenide (GaAs), for example, or to fabricate the piezoelectric medium in the form of a thin film, that is to say having a thickness of the order of a fraction of the elastic wavelength and deposited on a wafer of semiconducting material.

During operation, there are applied to the transducers $T_1$ to $T_4$ respectively four electrical signals of the form:

on $T_1$: $S_1 = f(t) \cdot e^{j\omega_1 t}$
on $T_2$: $S_2 = h(t) \cdot e^{j\omega_2 t}$
on $T_3$: $S_3 = g(t) \cdot e^{j\omega_1 t}$
on $T_4$: $S_4 = r(t) \cdot e^{j\omega_2 t}$ In other words, the signals applied in the same direction have the same frequency: angular frequency $\omega_1$ in respect of the direction Ox and angular frequency $\omega_2$ in respect of the direction Oy.

It is already known that the interaction of these waves produces non-linear effects among which are considered those of the fourth order which are of the form:

$$I(x,y) \times f\left(t - \frac{x}{v_x}\right) \cdot g\left(t + \frac{x}{v_x}\right) \cdot [\exp\{j(\omega_1 t - k_1 x)\} + C.C.]$$
$$\cdot [\exp\{j(\omega_1 t + k_1 x)\} + C.C.]$$
$$\times h\left(t - \frac{y}{v_y}\right) \cdot r\left(t + \frac{y}{v_y}\right) \cdot [\exp\{j(\omega_2 t - k_2 y)\} + C.C.]$$
$$\cdot [\exp\{j(\omega_2 t + k_2 y)\} + C.C.]$$

where:
$v_x$ is the velocity of propagation of the elastic waves in the substrate 1 in the direction Ox,
$v_y$ is the same velocity in the direction Oy, C. C. is the abbreviation of the conjugate complex function.

By developing the preceding expression, it is found that there appears a term of angular frequency $2(\omega_1 + \omega_2)$ and of zero wave number:

$$I(x,y) \cdot f\left(t - \frac{x}{v_x}\right) \cdot g\left(t + \frac{x}{v_x}\right) \cdot$$
$$h\left(t - \frac{y}{v_y}\right) \cdot r\left(t + \frac{y}{v_y}\right) \cdot e^{2j(\omega_2 + \omega_1)t}$$

Is is this term which is employed in the present invention because it does not have any spatial modulation (zero resultant wave number), thus making it possible to collect the corresponding signal between the two electrodes 3 and 4. Since it does not have to be spatially adapted, the electrode 4 can therefore be provided in the form of a single and continuous electrode. An output filter centered on the frequency $(\omega_1 + \omega_2/\pi)$ serves to isolate the useful signal. It can be readily understood that $\omega_1$ and $\omega_2$ must be chosen so as to ensure that the angular frequency $2(\omega_1 + \omega_2)$ is different from the angular frequencies of the other terms supplied by the interaction.

The output signal corresponding to the entire interaction zone ABCD is written:

$$P(t) = e^{2j(\omega_1 + \omega_2)t} \cdot \underset{ABCD}{\int\int} I(x,y) \cdot f\left(t - \frac{x}{v_x}\right) \cdot \qquad (1)$$
$$g\left(t + \frac{x}{v_x}\right) \cdot h\left(t - \frac{y}{v_y}\right) \cdot r\left(t + \frac{y}{v_y}\right) \cdot dx \cdot dy$$

Depending on the form chosen for the functions f(t), g(t), h(t) and r(t), the signal P can represent either point-by-point direct reading of the image I or its Fourier transform or else its Fresnel transform.

In a first embodiment of the device according to the invention, two pulse-type signals are employed such as the signal $S_1$ along Ox and the signal $S_2$ along Oy, and two signals of substantial length having an amplitude which is constant, for example, and considered as equal to unity for the sake of simplification. The signals applied to the transducers then become:

on $T_1$: $f(t) = \delta(t)$ (Dirac function), whence $S_1 = \delta(t) \cdot e^{j\omega_1 t}$
on $T_2$: $h(t) = \delta(t - \theta)$: Dirac function delayed by a time interval $\theta$ with respect to $S_1$, whence $S_2 = \delta(t - \theta) \cdot e^{j\omega_2 t}$
on $T_3$: $g(t) = 1$, whence $S_3 = e^{j\omega_1 t}$
on $T_4$: $r(t) = 1$, whence $S_4 = e^{j\omega_2 t}$ If these values are substituted in the expression (1) of the output signal P, we obtain:

$$P(t) = e^{2j(\omega_1 + \omega_2)t} \cdot$$
$$\underset{ABCD}{\int\int} I(x,y) \cdot \delta\left(t - \frac{x}{v_x}\right) \cdot \delta\left(t - \frac{y}{v_y} - \theta\right) \cdot dx \cdot dy$$
$$= I[v_x t, v_y(t - \theta)] \cdot e^{2j(\omega_1 + \omega_2)t}$$

This signal represents, at the angular frequency $2(\omega_1 + \omega_2)$, the reading of the image I along a diagonal line of coordinates $X = v_x t$ and $Y = v_y(t - \theta)$, which yields the equation $Y = (v_y/v_x) \cdot X - v_y \theta$. This reading clearly depends on the relative time-lag $\theta$ between the waves $S_1$ and $S_2$ and it is apparent that, by carrying out successively N sweeps of the surface ABCD with N different values of $\theta$, scanning of the image I in N parallel lines is thus obtained.

This result is illustrated in FIG. 2. There are shown in FIG. 2 only the plane xOy and the two transducers ($T_1$ and $T_2$) which emit the pulses as well as the interaction surface ABCD. The position of the elastic pulses is represented at a given instant t by hatched or shaded strips designated as $S_1$ and $S_2$ for the sake of simplification: the pulse $S_1$ is parallel to $T_1$ at a distance $d_1 = v_x t$ from this latter and the pulse $S_2$ is parallel to $T_2$ at a distance $d_2 = v_y(t - \theta)$ from this latter. The intersection 5 of these two waves constitutes an elementary interaction zone. When the two pulses $S_1$ and $S_2$ are propagated, their intersection 5 describes a straight line $L_i$. The angle made with Ox by said straight line $L_i$ depends only on the directions of emission and on the velocities of the waves $S_1$ and $S_2$; if, as shown in the figure, $S_1$ is emitted along Ox and $S_2$ is emitted along Oy and if $v_x = v_y$, $L_i$ makes an angle of $\pi/4$ with Ox.

Moreover, since the position of the line $L_i$ in the plane xOy depends on the time-lag $\theta$ of $S_2$ with respect to $S_1$, it is apparent that as shown earlier by calculation, a surface such as ABCD can be scanned in a raster pattern of N lines parallel to the straight line $L_i$ by emitting N pairs of pulses $S_1$-$S_2$ with N different values of their relative time-lag $\theta$.

Finally, it is possible to rotate the projection of the image through $\pi/4$ and to limit its projection area to a zone EFGH inscribed in the surface ABCD, two sides of which are parallel to the line $L_i$, in order to ensure more conventional scanning of said image in a raster pattern of horizontal lines. In this case, the surface of the signal electrode (4) is limited to the area opposite to the surface EFGH.

By means of the device according to the invention, point-by-point scanning of an optical image can be carried out by utilizing only two directions of propagation in the case of the elastic waves whilst the spatially uniform output signal does not need to be collected by means of a periodic detector.

In a second embodiment of the device according to the invention, signals of long duration are applied to each transducer in order to obtain a Fourier transform of the optical image. To this end, the following signals are employed:

on $T_1$: $f(t) = \exp[j\delta\omega_1 t]$, $\delta\omega_1$ being an angular frequency step which is close to zero, whence
$S_1 = \exp[j\delta\omega_1 t]\cdot\exp[j\omega_1 t]$ on $T_2$: $h(t) = 1$, whence $S_2 = \exp[j\omega_2 t]$ on $T_3$: $g(t) = 1$, whence $S_3 = \exp[j\omega_1 t]$ on $T_4$: $r(t) = \exp[j\cdot\delta\omega_2\cdot t]$, $\delta\omega_2$ being another angular frequency step which is close to zero, whence
$S_4 = \exp[j\delta\omega_2 t]\cdot\exp[j\omega_2 t]$ By substituting these values in expression (1) of the output signal P, we obtain:

$$P(t) \propto e^{2j(\omega_1+\omega_2)t} \cdot \int\int_{ABCD} I(x,y)\cdot\exp\left\{-j\left(\frac{\delta\omega_1}{v_x}x + \frac{\delta\omega_2}{v_y}y\right)\right\}\cdot dx\cdot dy$$

If $K_x$ designates the quantity $(\delta\omega_1/v_x)$, and $K_y$ designates the quantity $(\delta\omega_2/y)$, it is apparent that the quantity under the integral is one point of the Fourier transform:

$$\mathfrak{I}(K_x,K_y) = \int\int I(x,y)\cdot\exp[-j(K_x x + K_y y)]\cdot dx\cdot dy$$

of the image $I(x,y)$. We therefore have:

$$P(t) \propto e^{2j(\omega_1+\omega_2)t}\cdot\mathfrak{I}(K_x, K_y)$$

A signal representing one point of the Fourier transform of the image is thus obtained and is available on the signal electrode 4. In order to obtain another point, it is only necessary to begin this reading operation once again with slightly different values for the angular frequencies $\delta\omega_1$ and $\delta\omega_2$. Moreover, the electrical signal which is available on the electrode 4 represents the information only when the elastic waves cover the entire interaction zone. As will readily be understood, said signal must accordingly be collected only at that time and a disadvantage of this mode of reading further becomes apparent in this case: in order to process another point of the Fourier transform, it is necessary to wait until the pulsation waves $\delta\omega_1$ and $\delta\omega_2$ have disappeared from the interaction surface and until different pulsation waves $\delta\omega_1'$ and $\delta\omega_2'$ occupy the entire surface, which is equal to the time of transit (T) of an elastic wave over the entire interaction surface.

In order to overcome this defect, a third mode of application of the device in accordance with the invention has for its object to apply frequency ramps to each transducer or, in other words, signals having a frequency which varies linearly with time:

on $T_1$: $f(t) = e^{j\alpha_1 t^2}$, whence $S_1 = e^{j\alpha_1 t^2}\cdot e^{j\omega_1 t}$ on $T_2$: $h(t) = e^{j\alpha_2(t-\theta)^2}$, whence $S_2 = e^{j\alpha_2(t-\theta)^2}\cdot e^{j\omega_2 t}$ on $T_3$: $g(t) = e^{-j\alpha'_1 t^2}$, whence $S_3 = e^{-j\alpha'_1 t^2}\cdot e^{j\omega_1 t}$ on $T_4$: $r(t) = e^{-j\alpha'_2(t-\theta)^2}$, whence $S_4 = e^{-j\alpha'_2(t-\theta)^2}\cdot e^{j\omega_2 t}$ $\alpha_1$, $\alpha'_1$, $\alpha_2$ and $\alpha'_2$ being coefficients of proportionality.

Choosing $\alpha_1 = \alpha'_1$ and $\alpha_2 = \alpha'_2$, and substituting in equation (1), we obtain $$P(t) = e^{2j(\omega_1+\omega_2)t}\cdot$$

$$\int\int_{ABCD} I(x,y)\cdot\exp\left\{-4j\left(\frac{\alpha_1 t}{v_x}x + \frac{\alpha_2(t-\theta)}{v_y}y\right)\right\}\cdot dx\cdot dy$$

If $K_1$ designates the quantity $4(\alpha_1 t/v_x)$ and if $K_2$ designates the quantity $(4\alpha_2/v_y)(t-\theta)$, it is apparent that the expression under the integral is the Fourier transform of the image I:

$$\mathfrak{I}(K_1,K_2) = \int\int_{ABCD} I(x,y)\cdot e^{-j(K_1 x + K_2 y)} dx\cdot dy$$

hence $$P(t) = e^{2j(\omega_1+\omega_2)t}\cdot\mathfrak{I}\left[\frac{4\alpha_1 t}{v_x}x, \frac{4\alpha_2(t-\theta)}{v_y}y\right]$$

A scan along one line at a rate which is related to $\alpha_1$ and $\alpha_2$ is obtained in this case in the same manner as the first embodiment but within the Fourier transform space; a raster pattern of N parallel lines is obtained as before by performing N successive scans with N different values of the time-lag $\theta$.

Speed of reading is greatly increased in comparison with the second mode of execution. In fact, it is no longer necessary to wait until the time interval T mentioned earlier has elapsed in order to read a second point of the Fourier transform: a time interval 1/B in which B is the pass-band of the system is sufficient in this case. This means that the reading operation is B.T times faster, BT being in any case equal to the number of resolvable independent points of one line of the image.

A further advantage of this third mode of execution lies in the fact that the slope of the scan line depends on the coefficients $\alpha_1$ and $\alpha_2$ and more precisely on the ratio $\alpha_1/\alpha_2$. It is therefore possible to carry out any desired rotation of the image electronically by choosing the ratio $\alpha_1/\alpha_2$.

When it is not desired to subject the image to rotation, the value chosen $\alpha_1$ is fairly high and the value chosen for $\alpha_2$ is low in order to ensure that the frequencies of the signals $S_2$ and $S_4$ which are a function of $\alpha_2$ may be considered as constants during the time of scanning of a line.

FIGS. 3a and 3b show one example of time-dependent variation of the frequency of the applied signals.

By way of example, there are shown in FIG. 3a three segments 31, 32 and 33 having the same slope $\alpha_1$ and the same time-duration $t_1$ and illustrating the time-dependent variation in frequency of the signals $S_1$ and $S_3$ which propagate along Ox. The period $t_1$ represents the scanning time of one line.

FIG. 3b gives an idea of the progressive variation in time of the frequency of the signals $S_2$ and $S_4$ which propagate along Oy. By way of example, this variation is represented by a straight line 34 having a sufficiently low slope $\alpha_2$ with respect to $\alpha_1$ to ensure that the frequency can be considered as constant during the period $t_1$. The length of the straight line 34 represents the scanning time of a raster or field having N parallel lines.

FIG. 3c represents the scanning field obtained with the values of $\alpha_1$ and $\alpha_2$ indicated earlier within the Fourier transform space ($K_1$, $K_2$). This scanning field is made up of N parallel lines which are slightly inclined with respect to the axis $K_1$.

The output signal is therefore similar to the video signal of a conventional television camera but the information contained therein is that of the Fourier transform of the image.

It has been assumed in the foregoing that $\alpha_1 = \alpha'_1$ and $\alpha_2 = \alpha'_2$. If it is found that these conditions are no longer satisfied but that there exists between these parameters the following relation:

$$\frac{\alpha_1 - \alpha'_1}{v_x^2} = \frac{\alpha_2 - \alpha'_2}{v_y^2} = \frac{A}{v^2}$$

a Fresnel transform of the image is then obtained in like manner.

There has thus been provided a device of simple design, especially at the level of the output signal detector. The device utilizes the interaction of four elastic waves with only two different directions, thus making it possible to obtain both point-by-point scanning of an optical image and its transforms in a fast reading operation.

As will be readily understood, the invention is not limited to the embodiments hereinabove described. It accordingly follows, for example, that the axes Ox and Oy are not necessarily at right angles to each other. Similarly, known methods for improving the sensitivity of acoustoelectric devices for reading optical images can be applied to the present invention. One of these methods which can be mentioned by way of example and is described in particular in U.S. Pat. No. 4,084,192 in the name of THOMSON-CSF, consists in placing diodes on that surface of the piezoelectric substrate which is located opposite to the interaction surface. Another method consists in carrying out the reading operations in two stages, this method being described in U.S. Pat. No. 4,122,495 in the name of THOMSON-CSF. Finally, different variants can also be contemplated such as the emission of only three elastic waves with simultaneous application of a signal having the angular frequency $2(\omega_1 + \omega_2)$ to the signal electrode 4, the output signal in this case being contained within a fourth elastic wave produced by the interaction.

What is claimed is:

1. An acoustoelectric device for reading or processing a two-dimensional optical image, comprising a piezoelectric medium carrying four electromechanical transducers for converting an electrical signal into elastic waves which propagate in only two distinct directions at the surface of the piezoelectric medium and reciprocally, a photosensitive medium for receiving the optical image on an interaction surface and for converting the photons constituting the image into electric charges, and an electrically non-linear medium electrically coupled to said photosensitive medium, said elastic waves producing non-linear interaction in said non-linear medium, the amplitude of said interaction depending on the concentration of the electric charges, the output signal of the device being produced by said interactions, the wave vectors of said four elastic waves being such that the vector resulting from the non-linear interaction of three of said waves is equal and opposite to the wave vector of the fourth of said elastic waves.

2. A device according to claim 1, wherein one elastic wave in each direction has a pulse waveform, the other two waves being waves of long duration at least equal to double the scanning time of the interaction surface by an elastic wave, the surface of intersection of the two pulsed elastic waves being such as to define an elementary interaction zone, said pulses being emitted with a period at least equal to the time of scansion of one line of the interaction surface by the elementary zone, and variable relative time-lags for ensuring line scanning of the interaction surface by the elementary zone, the interaction of said waves being thus intended to deliver a signal which is representative of the light distribution of the scanned image.

3. A device according to claim 1, wherein one elastic wave in each direction has a frequency close to but different from the carrier frequency, the other two waves being unmodulated waves having a length at least equal to the time of scansion of the interaction surface by an elastic wave, the interaction of said waves being such as to provide one point of the Fourier transform of the image, the other points of the Fourier transform of the image being provided by the variation in the frequencies of the elastic waves in each direction.

4. A device according to claim 1, wherein each wave is frequency-modulated in a linear manner.

5. A device according to claim 4, wherein the elastic waves emitted in a first direction are frequency-modulated in a linear manner with slopes $\alpha_1$ and $-\alpha_1$ respectively and the elastic waves emitted in a second direction are frequency-modulated in a linear manner with slopes $\alpha_2$ and $-\alpha_2$ respectively, the waves being emitted in the second direction with a variable time-lag with respect to the waves emitted in the first direction, the interaction of said wave trains being such as to provide the Fourier transform of the image.

6. A device according to claim 4, wherein the elastic waves emitted in a first direction are frequency-modulated in a linear manner with slopes $\alpha_1$ and $\alpha'_1$ respectively and wherein the elastic waves emitted in a second direction are frequency-modulated in a linear manner with slopes $\alpha_2$ and $\alpha'_2$ respectively, said slopes being related to each other and to the respective velocities $v_x$ and $v_y$ of the elastic waves in the two directions by the relation:

$$\frac{\alpha_1 - \alpha_1'}{v_x^2} = \frac{\alpha_2 - \alpha_2'}{v_y^2}$$

the waves being emitted in the second direction with a variable time-lag with respect to the waves emitted in the first direction, the interaction of said wave trains being such as to provide the Fresnel transform of the image.

7. A device according to claim 1, wherein the two distinct directions are at right angles to each other and wherein the waves emitted in the same direction have the same frequency.

8. A device according to claim 1, wherein each transducer emits an elastic wave and wherein the signal resulting from the interaction of the four elastic waves is a spatially uniform signal collected by means of continuous electrodes.

9. A device according to claim 1, wherein the nonlinear medium and the photosensitive medium are combined in one and the same material.

10. A device according to claim 8, wherein the piezoelectric medium is constituted by a first wafer and wherein the non-linear and photosensitive medium is constituted by a second wafer formed of semiconducting material, the two wafers being separated by an air gap, the elastic waves being propagated on a first face of the semiconducting wafer, the interaction surface being carried by that face of the second wafer which is opposite to the first face of the piezoelectric wafer, the continuous electrodes for delivering the output signal of the device being placed respectively on the external faces of the two wafers.

* * * * *